United States Patent
Robins et al.

(10) Patent No.: US 10,579,396 B2
(45) Date of Patent: Mar. 3, 2020

(54) SYSTEM AND AUTOMATED METHOD FOR CONFIGURING A PREDICTIVE MODEL AND DEPLOYING IT ON A TARGET PLATFORM

(71) Applicant: NICE-SYSTEMS LTD., Ra'anana (IL)

(72) Inventors: Simon Robins, Haifa (IL); Pinchas Ben-Or, SW Issaquah, WA (US); Diana Shnaider, Modi'in (IL)

(73) Assignee: NICE-SYSTEMS LTD., Ra'anana (IL)

( * ) Notice: Subject to any disclaimer, the term of this patent is extended or adjusted under 35 U.S.C. 154(b) by 82 days.

(21) Appl. No.: 14/248,367

(22) Filed: Apr. 9, 2014

(65) Prior Publication Data

US 2015/0293755 A1  Oct. 15, 2015

(51) Int. Cl.
*G06F 8/35* (2018.01)
*G06F 9/445* (2018.01)

(52) U.S. Cl.
CPC ............ *G06F 9/44526* (2013.01); *G06F 8/35* (2013.01)

(58) Field of Classification Search
CPC ........................................................ G06F 8/35
USPC ........................................................ 717/104
See application file for complete search history.

(56) References Cited

U.S. PATENT DOCUMENTS

| | | | | |
|---|---|---|---|---|
| 8,583,471 B1* | 11/2013 | Voskuhl | ............. | G06Q 30/0254 705/14.53 |
| 9,244,706 B2* | 1/2016 | Calev | ................. | G06F 9/45512 |
| 2002/0180805 A1* | 12/2002 | Chickering | ............ | G06Q 10/02 715/812 |
| 2007/0271275 A1* | 11/2007 | Fassette | .............. | G06F 21/6227 707/10 |
| 2009/0187899 A1* | 7/2009 | Mani | ...................... | G06F 9/4401 717/168 |
| 2011/0055074 A1* | 3/2011 | Chen | ...................... | G06Q 20/10 705/39 |
| 2012/0078681 A1* | 3/2012 | Rahman | ............. | G06Q 30/0201 705/7.29 |
| 2014/0059073 A1* | 2/2014 | Zhao | ................. | G06F 17/30424 707/769 |
| 2014/0259157 A1* | 9/2014 | Toma | .................. | H04L 63/1408 726/22 |

OTHER PUBLICATIONS

Bolton et al., "Statistical Fraud Detection: A Review", Statistical Science, Jan. 2002, pp. 235-255, vol. 17, No. 3.
Shen et al., "Application of Classification Models on Credit Card Fraud Detection", IEEE, Jun. 2007, pp. 1-4.

* cited by examiner

*Primary Examiner* — Hang Pan
*Assistant Examiner* — Bradford F Wheaton
(74) *Attorney, Agent, or Firm* — Pearl Cohen Zedek Latzer Baratz LLP

(57) ABSTRACT

Method and system for configuring a model and deploying it on a target. The method may include using a processing unit, automatically generating a plugin based on a statistical model, the plugin including variables and issue definitions extracted from the model; and deploying the plugin on a target platform.

18 Claims, 11 Drawing Sheets

```
EVALUATE (
CREATE_SET (
/************************************/
TO_TUPLE ("value", "transactionKey" ),
TO_TUPLE ("value", "TBX_CS14" ),
TO_TUPLE ("value", "TERMINAL_ID"),
TO_TUPLE ("value", "DEVICE_STATE" ),
TO_TUPLE ("value", "DEVICE_COUNTRY_CD"),
TO_TUPLE ("value", "CARD_CS3" ),
TO_TUPLE ("value", "S0013_MAX_DAILY_CNT" ),
TO_TUPLE ("value", "S0011_MAX_DAILY_CNT" ),
TO_TUPLE ("value", "S0003_MAX_DAILY_CNT" ),
TO_TUPLE ("value", "S0001_MAX_DAILY_CNT" ),
TO_TUPLE ("value", "C1301_MAX_DAILY_CNT" ),
TO_TUPLE ("value", "C1300_MAX_DAILY_AMT" ),
TO_TUPLE ("value", "C1215_MAX_DAILY_CNT" ),
TO_TUPLE ("value", "C1212_MAX_DAILY_AMT" ),
TO_TUPLE ("value", "C1208_MAX_DAILY_AMT" ),
TO_TUPLE ("value", "C1204_MAX_DAILY_AMT" ),
TO_TUPLE (Uvalue", "C1202_MAX_DAILY_AMT" ),
TO_TUPLE ("value", "C1202_MAX_DAILY_CNT" ),
TO_TUPLE ("value", "C1200_MAX_DAILY_AMT" ),
TO_TUPLE ("value", "C0706_MAX_DAILY_AMT" ),
TO_TUPLE ("value", "C0704_MAX_DAILY_AMT" ),
Active Expression
```

Fig. 10

| | | | |
|---|---|---|---|
| ▽ | ? Alerts:DCF0130001 | | |
| ⬇⬇ Switch to WorkFlow | | All Items ◁▷ | Items 3 of 164 |
| Debit Card - Suspicious Card Acitvity Related Alerts(7,7 open) I DART | | | |
| Alert Id | DCF0130001 | Card Number 4134610290020... | Event Name |
| Card Score | 80 | Customer Name | Event Description |
| Trans Score | 80 | Customer Id 00188649 | Event Number |
| Alert Auburn Hill.. | 2013-04-1220:0 ... | | Event File Date |
| | | | Event Severity |

| Issues | Investigation | Transaction Activity | Customer Details | Card Details | Card Activity |

Issues

| Issue Type | Issue Description | Value | Impact |
|---|---|---|---|
| Monetary | Unusual High Dollar Transaction Amount | Total Amount: | Med |
| Monetary | Suspicious Similar Amount Sequence Activity | 2 | Med |
| Monetary | Suspicious Total Amount | Total Amount:260000000.55 | Med |

Custom Issues

| Issue Type | Issue Description | Value | Custom Score |
|---|---|---|---|

Fig. 11

SYSTEM AND AUTOMATED METHOD FOR CONFIGURING A PREDICTIVE MODEL AND DEPLOYING IT ON A TARGET PLATFORM

FIELD OF THE DISCLOSURE

The present invention relates to fraud detection. More specifically, the present invention relates to method and system for configuring a predictive model and deploying it on a target platform.

BACKGROUND

The increase in electronic transactions in the last decade has brought about a substantial increase in fraudulent activity associated with electronic transactions. Credit card fraud, for example, involves theft using a credit card or similar payment means as a fraudulent financing source in a transaction.

Although credit card fraud amounts to a fraction of the all credit card transactions it accounts for huge financial losses, as many fraudulent transactions are large value transactions.

Credit card fraud detection involves monitoring transaction activity and detecting suspicious activity. Fraud detection techniques may be classified into two classes: statistical detection methods and artificial intelligence techniques. Examples of statistical data analysis techniques include data pre-processing techniques for detection, validation, error correction, and filling in of missing or incorrect data; calculation of various statistical parameters such as averages, quantiles, performance metrics, probability distributions, and so on; models and probability distributions of various business activities either in terms of various parameters or probability distributions; computing user profiles; time-series analysis of time-dependent data; clustering and classification to find patterns and associations among groups of data; and matching algorithms to detect anomalies in the behavior of transactions or users as compared to previously known models and profiles.

Predictive modelling is a process by which a model is created or chosen to try to best predict the probability of an outcome. A model may be chosen on the basis of detection theory to try and guess the probability of an outcome given a set amount of input data.

Predictive analytics relates to a variety of statistical techniques from modelling, machine learning, and data mining that analyse current and past facts to make predictions about future events.

SUMMARY

According to some embodiments of the present invention, there is disclosed a method for configuring a predictive model and deploying it on a target platform. The method may include using a processing unit, automatically generating a plugin based on a statistical model, the plugin including variables and definitions of predictive factors in a natural language extracted from the model. The method may also include deploying the plugin on a target platform.

In some embodiments of the present invention the method may include mapping the variables and definitions of predictive factors to a plugin code template and compiling the plugin code template.

In some embodiments the method may further include generating an example plugin function call.

According to some embodiments of the present invention the plugin may be configured to cause the target platform to present a score and predictive factors (e.g., issues) relating to a transaction based on a transaction data that was received by the target platform.

In some embodiments, the method may further include calculating a score for each issue indicator relating to the transaction data, and presenting the predictive factors for which the score is above a defined threshold.

According to some embodiments the method may include building the model.

In some embodiments the method may also include building the model on an analytics modelling platform.

According to some embodiments there is provided a non-transitory computer readable storage medium having stored thereon instructions that when executed by a processor would cause the processor to perform the method of automatically configuring a plugin based on a predictive model, the plugin including variables and issue definitions in a natural language extracted from the model; and deploying the plugin on a target platform.

According to some embodiments of the present invention there is provided a system. The system may include a processing unit, the processing unit configured to automatically generate a plugin based on a predictive model, the plugin including variables and issue definitions extracted from the model; and deploy the plugin on a target platform.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

FIG. 10 shows an example of a screen shot of a screen showing an expanded EVALUATE function, according to some embodiments of the present invention.

FIG. 11 shows an example of a screen shot of a screen showing an alert displaying a list of predictive factors and their level of impact, as determined according to some embodiments of the present invention.

DETAILED DESCRIPTION

Figure 1:
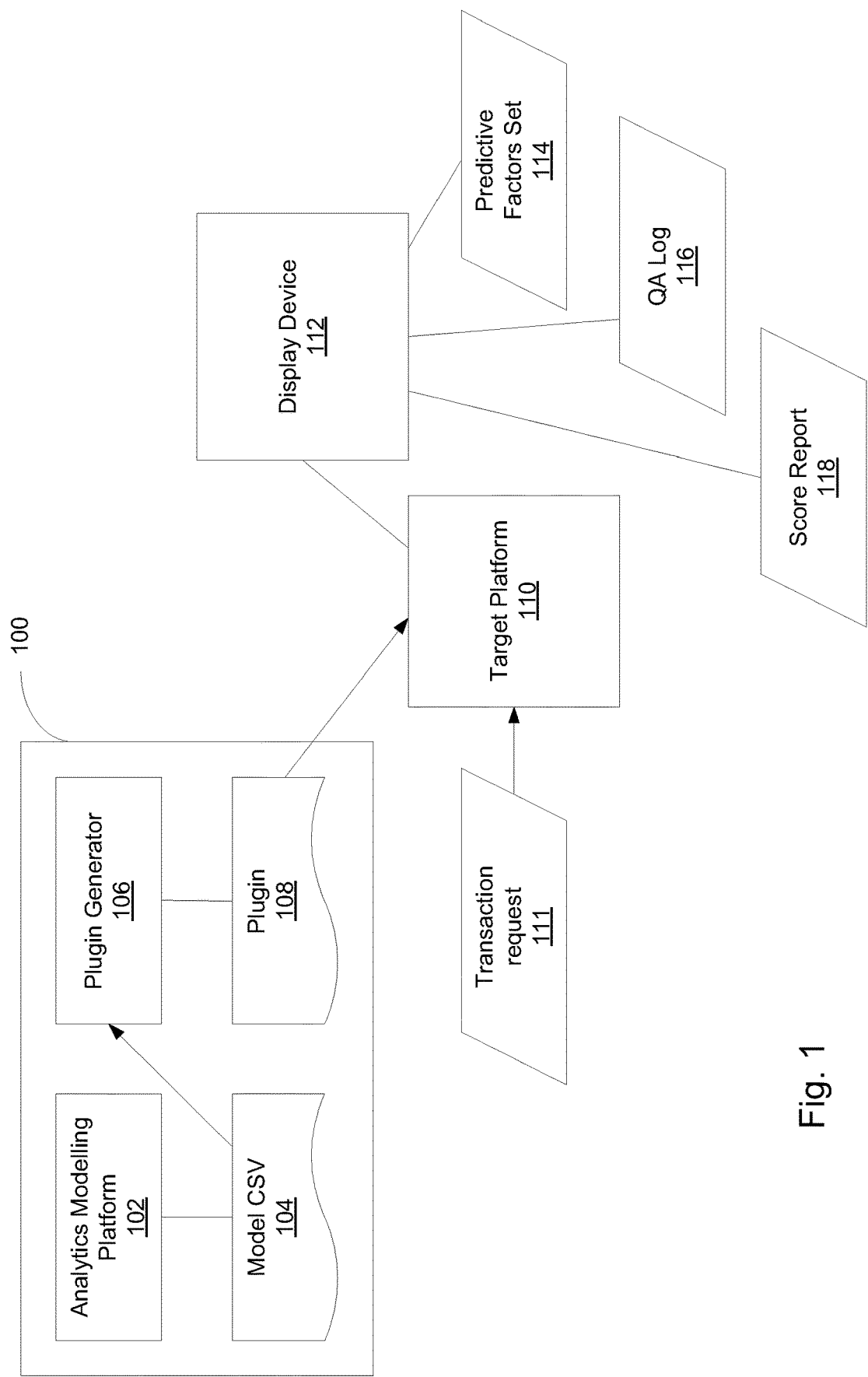
FIG. 1 illustrates a schematic illustration of system for configuring a model and deploying it on a target platform, according to embodiments of the present invention.

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

When developing fraud detection, risk detection and/or predictive models (hereinafter generally referred to as predictive models) a model builder is faced with several predictive factors. First, the platform and environment used for building the complex statistical model are likely to be different than the platform and environment on which the model is consequently executed.

In many cases the execution environment will have very strict limitations on the time needed for executing the model as it is desired to execute transactions in as near to real time as possible in order to avoid customer dissatisfaction. Modelling environments are nearly always unsuited to be used under these constraints, and the model needs to be ported to the execution environment.

Furthermore, it is desired to have the translation of the model to the execution environment automated as much as possible, and the format used for transferring the model to the execution environment should preferably be as simple as possible.

When a model in the execution environment flags a particular transaction as suspicious, it is desired to communicate to the operator, fraud investigator or risk analyst (hereinafter—operator) why the model has flagged that transaction in a natural language. "Natural language" refers to any ordinary language, which is the language of human user or users for whom a system according to embodiments of the present invention is intended.

As a model is typically based on potentially many hundreds or thousands of variables, it is desirable that the most important of these be prioritized and communicated to the operator in a manner that is understandable to operator (and ultimately to the end customer).

Predictive Model mark-up Language (PMML) is an XML-based file format that was developed for describing and exchanging models produced by data-mining and machine algorithms. While it is convenient to use PMML when describing models, it has no built in method for adding natural language descriptions of factors contributing to model result, and any model used must be predefined in the standard, with special support added to any systems evaluating the model for any new functionality.

Embodiments of the present invention are aimed at allowing a user (hereinafter also predictive modeler) modelling a predictive model to add description or descriptions of factors relating to the predictive subject matter to a model configuration. The descriptions may have values interpolated inside them, for example 'Credit card use has exceeded $3,000.00 in one week', etc.

In some embodiments, a Comma Separated Value (CSV) flat file format may be used to describe the model, which may be simple and concise relative to verbose XML-like PMML standard. The format described herein may include very few syntactic rules compared to hundreds of rules in PMML. CSV file format allows variables to be defined on a conditional basis using standard operators and a limited number of pre-defined functions if necessary. This simple format allows the predictive modeler to include many different forms of data transformations, for example missing value indications and substitutions, date transformations, ratio calculations, risk values for nominal variable values and score normalizations. The same format may be used to define linear regression equations, population segmentation calculations, and define decision tree rules without any change to the logic used for plugin generation (see hereinafter), with no need for the system to have any knowledge added as to what these calculations are. Such a format may also be used to define predictive factors (e.g., reasons, explanations) for the final score calculations, with minimal logical support added at the plugin generation phase. The CSV format could be used to calculate standard algorithms used in data mining or predictive modelling. It could also be used to define predictive factors for any standard algorithm that can be approximated using regression methods. These algorithms may include, for example, random forest classification trees or any other classification tree method, rulesets, association rules, Bayesian networks, neural networks and SVM (Support Vector Machines). Typically, no additional logic would need to be added to the system to support these algorithms.

According to some embodiments of the present invention, automation of code generation is provided, e.g. a software plugin generator, as part of the process which will take the model configuration and provide a plugin suitable for execution on a high availability, multi-threaded enterprise fraud or risk solution, and/or a prediction solution. In some embodiments the plugin may be Java compatible.

In accordance with embodiments of the present invention a unique model configuration is disclosed that may be used to automatically generate a software module (e.g., a 'plugin') for execution of that model on a production scale real time transaction server.

According to some embodiments of the invention a structure of a model configuration is specified that can be easily grasped by model developers and can be generated automatically from the process of model development.

The model configuration and plugin generation for the execution environment may be able to solve the problems of model portability and offering the operator a meaningful description of the reasons for flagging a suspicious transaction in a unified, efficient, and flexible way.

Aspects of embodiments of the present invention involve, inter-alia, automatic generation of a plugin from a simple CSV formatted table (e.g., a tabular organization of data) or other suitable data file describing the complex model; issue indicator calculations may be defined in the model CSV; an issue name, text and impact if the indicator is true may also be defined. The plugin may be called or executed from the transaction server (which monitors transactions in search for suspicious transactions) to give a score per transaction. The plugin may return a set of relevant predictive factors containing interpolated values, which are forwarded to an alert display platform (for display to the operator).

A "plugin", in the context of the present invention, relates to a software component that ads a specific feature to an existing software application. Software applications that support plugins allow customization, e.g., allow developers to add new capabilities or amend existing capabilities in a software application.

A "platform", in the context of the present invention, relates to any computing platform in the broadest context, whatever pre-existing environment a piece of software is designed to be executed within, obeying its constraints, and making use of its facilities. Typical platforms include a hardware architecture, an operating system and runtime libraries. The platform may also include: stand-alone hardware (e.g., embedded systems), a browser (in the case of web-based software), an application (e.g., spreadsheet, software framework, cloud computing and platform as service, a virtual machine (e.g. Java Virtual Machine—JVM), etc.

According to embodiments of the present invention, calculation of issue indicators is facilitated, which add a plain language (any human spoken language, as opposed to a computer language) description to a set of predictive factors (sometimes also referred to as reasons or reason codes) for the operator (typically a human) to inspect, and to explain the scenario to the anticipated victim of the fraud in a fraud risk application. If the model is a predictive model such as a marketing response model the 'predictive factors' or 'reasons' may be used to inform the marketing manager what are the key drivers of a high response probability and thus make the model understandable and credible.

FIG. 1 illustrates a schematic illustration of system for generating a model and deploying it on a risk management server, according to embodiments of the present invention.

A model building device 100 may include analytics modelling platform 102 on which a statistical model (e.g., statistical model for fraud detection) may be built. Based on large data sets, analytic modelling platform may be used to produce a model and semi-automatically produce a CSV file description of the model. In some embodiments, sections of the file may be automatically generated, with a human required to copy, paste and edit the various sections into a final CSV file In some embodiments the model may be arranged as a CSV formatted table. Such a table may include, for example, a set of tuples, each tuple including a block name, a variable name, a condition, true and false values, a type, etc.

An example of a CSV formatted table snippet is provided below:

TABLE A

| Block Name | Variable Name | Condition | True Value | False Value | Type |
|---|---|---|---|---|---|
| Var Definition | MY.VARIABLE | R$PREVIOUSLY.DEFINED.VARIABLE == 1 | 1 | 0 | |

In some embodiments the CSV formatted table may include, inter-alia, the following fields:

i) a description field describing the logical section of the model.

ii) a field containing the name of a variable that will have a value assigned to it, depending on the contents of subsequent columns.

iii) a field describing a condition (in some embodiments the condition may be defined, for example, by valid operators in the R language. R is a language and environment for statistical computing and graphics. R provides a wide variety of statistical (linear and nonlinear modelling, classical statistical tests, time-series analysis, classification, clustering, etc.) and graphical techniques. Reference to previously defined variables may be signified by an R$ prefix. It may be possible to make use of R language functions—see hereinafter. It may be possible to use arbitrary Scala language code)—Scala is an object-functional programming and scripting language for general software applications. It is intended to be compiled to Java bytecode, so the resulting executable runs on the Java Virtual Machine (JVM), and Java libraries can be used directly in Scala code and vice-versa.

iv) a field containing R language code defining an assignment made to the variable named in field (ii) if the condition in column (iii) evaluates to true (the definition would then be in valid R code. It may be possible to make use of R language functions—see examples hereinafter. It would be possible to use Scala functions. If the assignment is an issue definition it would typically have the following format:

{Level = High ,Basic__Var__Name = VREQUESTEDAMOUNT.SUB ,Issue Name = Issue__name ,Issue Text = Suspicious requested amount %s ,Direction = Risk} v) a field containing R language code defining an assignment made to the variable named in column (ii) if the condition in column (iii) evaluates to true (the definition would be in valid R code. It would be possible to make use of R language functions—see examples hereinafter. It would be possible to use Scala functions);

Vi) an optional field indicating whether the field is to be treated as a string. This may be later used for logging and internal handling of the field's value.

Once the model is completed, a plugin generator 106, which may be implemented as a software module, hardware module or a combination thereof, is used to generate a plugin 108. Plugin 108 may typically be a software code. According to some embodiments plugin 108 may be automatically generated by plugin generator 106. In some embodiments plugin 106 may be Java based, or Java compatible, allowing executing it on any Java enabled product. Processing unit 502 (see below) may be or may be configured to carry out functionality of plugin 108 by for example being connected to a memory containing software or code which when executed cause the controller to carry out such methods. For example, processing unit 502 may be or execute plugin generator 106.

Plugin 108 is then, according to some embodiments, deployed to or installed on a target platform 110, e.g. a risk management server. Target platform 110 may have an interface for calling arbitrary Java code. This may be achieved by copying the generated plugin to the appropriate location, and providing any configuration target platform 110 requires in order to locate the code entry point.

A call to the plugin may be added to a standard exit point in the target platform 110. The fields required for calculating the model may be mapped from the context of available fields in the exit point in a method call to plugin 108.

A transaction request 111 may be received at the target platform 110. Typically the transaction details would include fields identifying data of the parties (paying party and receiving party), the sum of the transaction, location of the point of sale, payment means (e.g. credit card details). This information may then be enriched by the target platform, for example, by obtaining additional information from database or databases relating to the payer or the receiving party, information on previous transactions of the payer, bank account information, historical data, etc.

When details of a requested transaction arrive at target platform 110 (serving as a risk detection server), its constituent fields and other fields that are precalculated by the platform are made available in the exit point.

In some embodiments of the present invention, plugin 108 may return a set of predictive factors 114 based on the calculation of the model. These predictive factors may be presented to an operator on a display device 112 (or other output device) in the form of alerts. Predictive factors may include, for example, "high number of balance inquiries in the last X hours", or "unusually large withdrawal for customer" for fraud detection, Customer has previously purchased cat food (X tins) and kitty litter (Y sacks), for a marketing implementation, etc.

In some embodiments plugin 108 may generate a separate quality assurance (QA) log 116 for quality assurance purposes. QA log 116 may include all or some intermediate and final variables that are calculated.

In some embodiments of the present invention a final score report 118 may be produced from the model. The score report 118 may include a rating or score and other variables and may be made available to the exit point, so further calculations and policy decisions can be made based on any of these variables.

Figure 2:
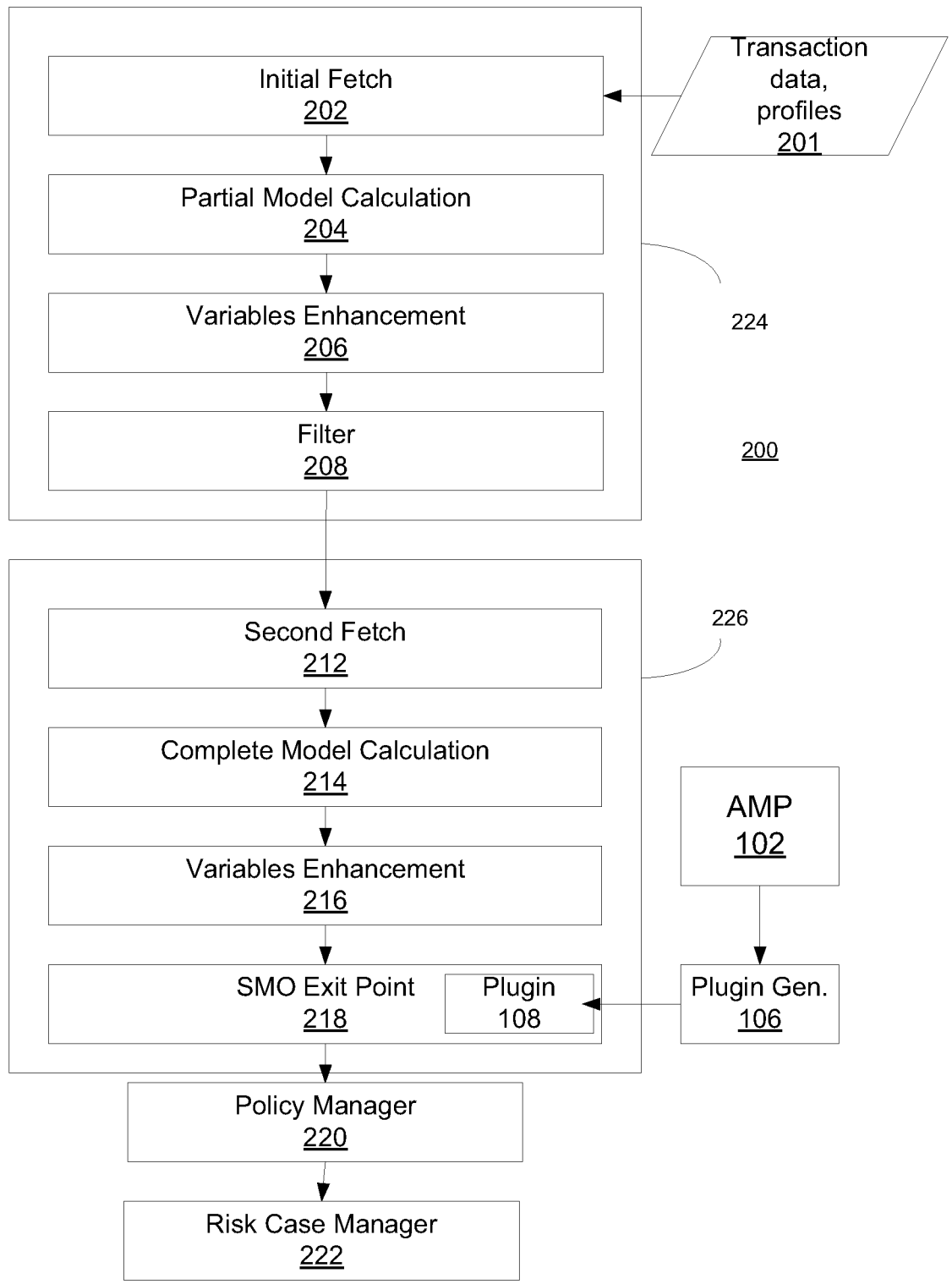
FIG. 2 illustrates a logic flow of an algorithm of fraud detection executed on a target platform which is a predictive management server, according to some embodiments of the present invention.

FIG. 2 illustrates a logic flow of method 200 of fraud detection executed on a target platform which is a risk management server, according to some embodiments of the present invention.

Method 200 may be implemented in for example two consecutive analytics phases. In a first initial analytics phase 224, transaction data, profile of one of the transaction parties (typically the payer) or profiles both parties to the transaction (payer and receiver) and in some cases also additional information is received in an initial fetch 202. Some partial model calculation 204 may be performed on that information, and variable enhancement 206 is carried our (e.g. additional information may be retrieved that relates to the payer, past transactions, geographical data, etc.). A filter 208 may be used to filter out results (e.g., payee appears on safe list, commercial mode and old payee).

In a second, complementary, analytics phase 226, a second fetch 212 may be carried out. For example, the second fetch may seek to obtain an 'expensive' (i.e., requires additional effort) network historical data. For example: all the previous transactions for the device (rather than the customer) or the previous transactions for the payee. Complete model calculation 214 may be performed, and additional variable enhancement 216. At the Structured Model Overlay (SMO) exit point 218, plugin 108, which was deployed by plugin generator 106, after a statistical model was built on AMP 102, introduces the built statistical model. Scores and predictive factors that are extracted may then be presented to a policy manager 220 (who may be a software module or actual person/s with authority and/or permissions to decide) and/or risk case manager 222 (who too may be a software module or actual person/s with higher authority and/or permissions to decide).

Figure 3:
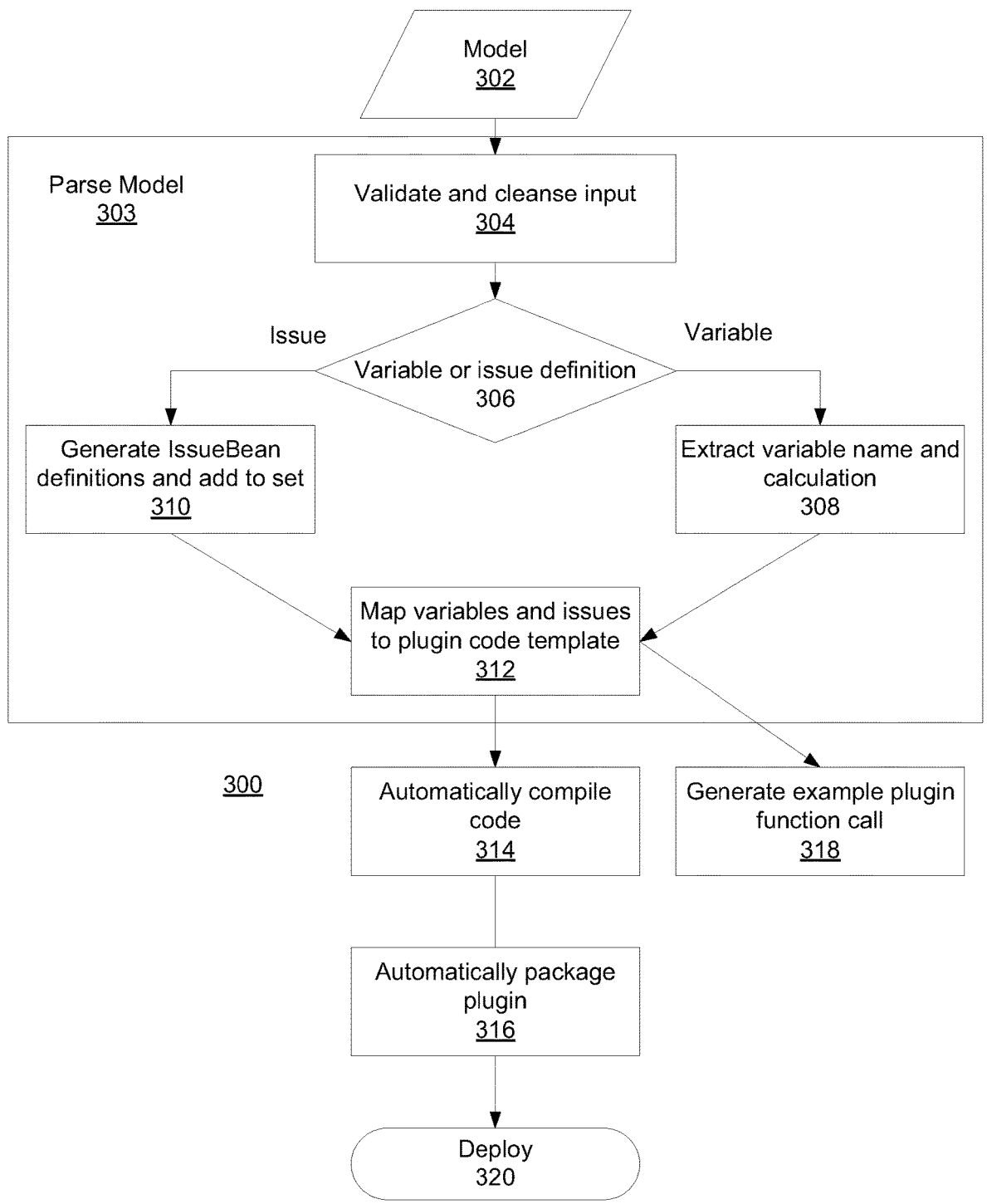
FIG. 3 illustrates a logical flow of a method of automatically generating a plugin, according to some embodiments of the present invention.

FIG. 3 illustrates a logical flow of a method 300 of automatically generating a plugin, according to some embodiments of the present invention.

According to some embodiments the plugin generator may be a Scala application that takes the path of the model (e.g., a model CSV file) and an output directory path to create intermediary files and a final plugin.

Method 300 may include parsing 303 a statistical model 302 (e.g. in a CSV format). Parsing 303 of the model 302 may include validating and cleansing 304 the input model. Syntax does not have to be checked at this stage, but missing values may be checked for and reported. The input statistical model data may be transformed to remove elements that may cause problems with Scala compilation, if such compilation method is used.

The parsing may also include determining 306 whether an expression in the model is an issue definition or a variable. A set of defined variables may be identified, and specifically a set of input variables that are required for the model that is to be implemented in the plugin, and a set of issue calculations. Issue definitions may be identified, for example, by giving them a distinctive name (e.g., a name that includes a distinctive postfix, such as, for example, ".issue").

If a variable, variable name and calculation may be extracted 308. Variable definitions may be parsed and added to an ordered set, corresponding to the order of the variables in the model file so as to allow previously defined variables to be available for use in further variable definitions.

If an issue, issue beans definitions may be generated 310, and added to a generated set of issue definitions. Each issue bean definition may be associated with a single issue identified.

The extracted values and issue definitions may be mapped 312 to a plugin code template. The variable definition set and issue set may be added to a source code template which is used to compile the plugin. According to some embodiments, the template may be written in the Scala language. The template may include a DSL (Domain Specific Language) definition which can be utilized by the person building the model to directly include a small subset of functions and constants from the R language which would typically be used extensively in the modeling process.

For example, the following example code snippet would be generated that relates to the variable fields (in CSV format) presented in Table A (hereinabove):

```
if (PREVIOUSLY_DEFINED_VARIABLE == 1) {
    MY_VARIABLE = 1
} else {
    MY_VARIABLE = 2
}
``` and, given the following issue definition fields, in CSV format:

| Block Name | Variable Name | Condition | True Value | False Value | Type |
|---|---|---|---|---|---|
| Issue Generation | HA.DTRULE.18.Issue | R$Ttx.segment== 'HA'& HA.Min.Product.DTRULE.18.IND > 0 | '{Level = Min, Basic_Var_Name = PAN.ENTRY.MODE.SUB, Issue Name = Issue_name, Issue Text = Risky method of use at terminal, Direction = Risk}' | ' ' | s |

The following corresponding code snippet would be generated:

```
if (Ttx_segment="HA" & HA_Min_Product_DTRULE_18_IND > 0) {
    addIssue(new IssueBean(Min, "Issue_name", "Risky method of use at terminal".format( PAN_ENTRY_MODE_SUB)))
} else {
    ""
}
```

The plugin code template may then be automatically compiled 314 (e.g., from Scala to JVM compatible bytecode—Java class files (any statistical errors may be reported at this stage)—and packaged 316, becoming available for deployment 320.

The plugin generator may also generate 318 an example function definition to a console, used to call the plugin from the risk management server. This may be used as a guide for implementers during deployment of the plugin. The console may be a command line interface where text output by the plugin generator can be displayed.

Figure 4:
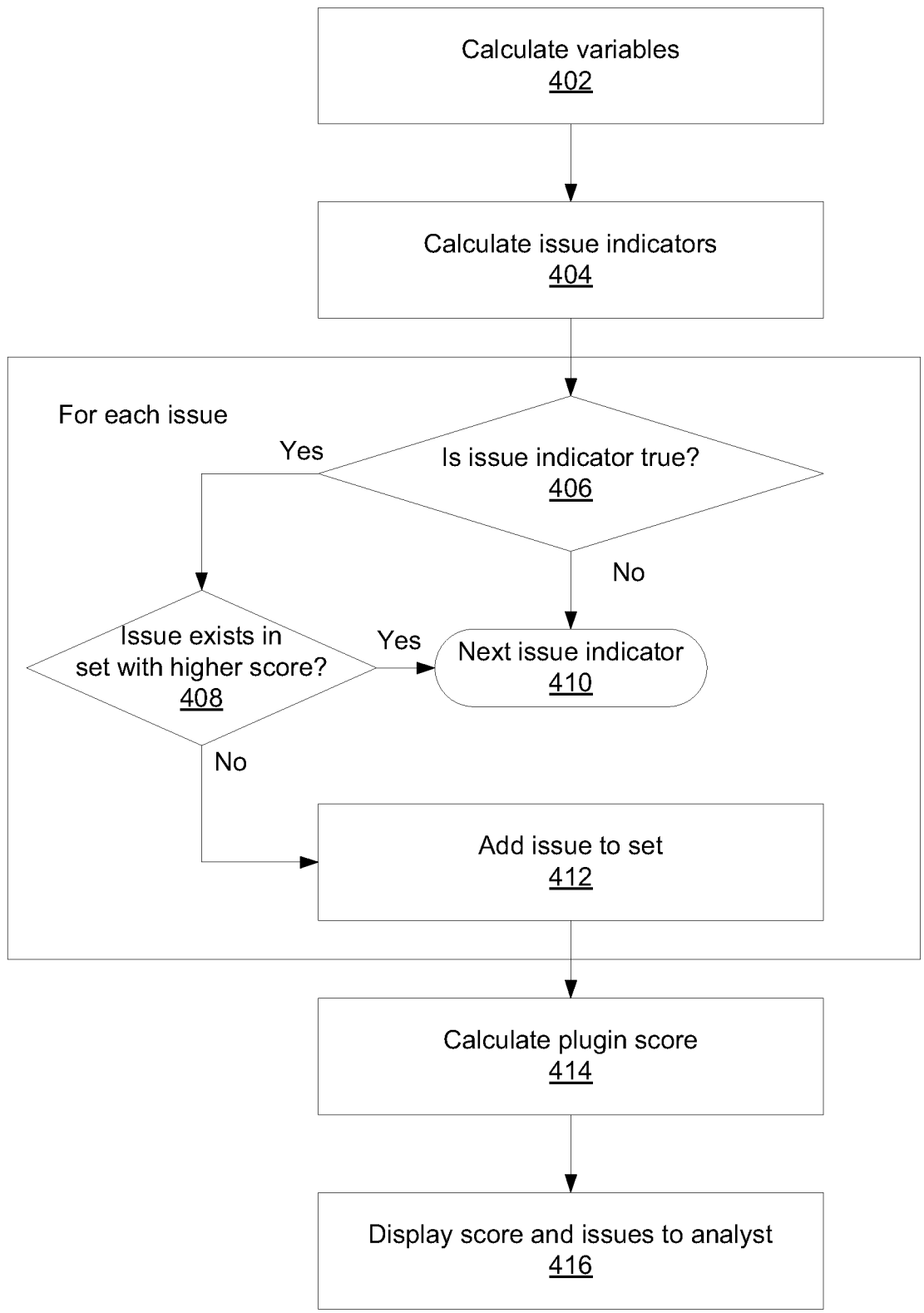
FIG. 4 illustrates operation of a plugin on a target platform, according to some embodiments of the present invention.

FIG. 4 illustrates operation of a plugin on a target platform, according to some embodiments of the present invention.

When a transaction data arrives at a risk management server, the plugin causes the calculation of variables 402 and issue indicators 404. Transaction data would typically be received from a bank or other financial institution. The transaction data may include many fields (e.g., in some embodiments, tens or hundreds of fields) depending on the institution or the type of predictive or risk being detected (e.g. debit card, remote banking). Some basic fields would normally be considered as mandatory; these include for example, customer identification (ID), transaction amount, transaction date and time.

The transaction data may be enriched, for example, by obtaining third party information, for example metadata linked to the internet address of the customer, or device information from other providers. Other types of enrichment data that can be included may comprise: key indicator values, information based on historical profiles for different entities involved in the transaction (for example card, account, payee, device), aggregated historical data (for example number of transactions in the recent period) and the score calculated by the fraud (or any predictive or risk) solution based on the key indicator values. If no transaction key was provided at this stage then one may be generated at this stage.

According to some embodiments, variable values and issue Indicators may be calculated together with a score. The data gathered and calculated may be made available to the exit point, where the plugin is called per transaction. The data required is mapped to the plugin function call. In some embodiments, each if/else statement assigning a value to a variable, as described in the example/s hereinabove, may be executed. The variables may be assigned to a Java Bean for returning to the target platform. In some embodiments, the plugin itself has practically no logic of its own and evaluates logic that is defined in the model (e.g., the model CSV file).

The variables calculated by the plugin may be returned as fields of a Java Bean. The fields included would typically differ for each model. However, in some embodiments of the invention a transaction key field would be included which can be used later for quality assurance purposes. Fields would include, in some embodiments the variables defined in the model including data transformations, and model scores.

Mapping may be performed using a function call containing relevant fields. A Transaction key would typically be provided. The fields in some embodiments of the plugin may be input as strings, with non-string fields converted to the string equivalents during mapping.

For each issue indicator, it is determined 406 whether the calculated indicator is true or false. If the calculated indicator is false than next issue indicator 410 is considered. If the calculated indicator is true, it is then determined whether that issue exists 408 in a set of predictive factors identified for the incoming transaction that is generated in this process, with a higher score than the score that was calculated for the current issue. If not, that issue is added 412 (e.g., an issue bean created and added) to the set of predictive factors. If there exists such an issue (e.g., an issue having the same name) in the generated set, the next issue indicator 410 is considered.

After all issue indicators were processed a plugin score is calculated 414 (e.g., as a normal variable), which may be displayed 416 with a list of the predictive factors to an analyst reviewing the transaction. The score may be, in some embodiments, normalized, if so desired.

The issue set may be added as a field to a Java bean. The exported values may be mapped to data structures expected by the target platform and used to forward alerts or other policy decisions to the operators using a risk case management platform to administrate alerts and other case workflows. A PMML based model may be also evaluated at this stage and the resulting score of the PMML based model may also be returned for further processing. The PMML model to be evaluated would typically be dependent on a calculated segmentation variable in the CSV model.

A Java class (data structure), according to some embodiments, used to store an individual issue may look like this:

| IssueBean |
| --- |
| +score : double
+name : String
+description : String
+model : String = SMO
+IssueBean(in score : double, in name : String, in description : String) : IssueBean |

The Java Bean returned by the plugin would normally have different fields for different models. Typically, a Java bean would have the following fields by default: TransactionKey (String), PMMLresult (Double)—this field would be uninitialized if PMML models are not used, Predictive factors (Array<IssueBean>)—the set of Issue Beans.

Other fields would have either a numeric (Double floating point) or String type.

The score may be calculated using regression. For example, in some embodiments, multiple logistic regression equations may be used, depending on the calculated segment of the transaction. Logistic regression is a type of probabilistic statistical classification model. Logistic regression measures the relationship between a categorical dependent variable and one or more independent variables.

A logistic regression equation may be made up of multiple variables and coefficients in the form Intercept+ coefficient1*variable1+coefficient2*variable2+ . . . +coefficientN*variableN.

Each element of this regression equation is defined as a new 'product' variable which contains the product of a variable and its coefficient (e.g., coefficient1*variable1). These calculations may be defined as part of the model and require no special treatment in the plugin.

Threshold values may be defined. These may be defined in the model and again require no special consideration from the plugin code. The thresholds set the percentage of the final score that any product must achieve in order to be defined as high, medium, or low impact. More impact levels can be defined in the model configuration as needed.

Figure 5:
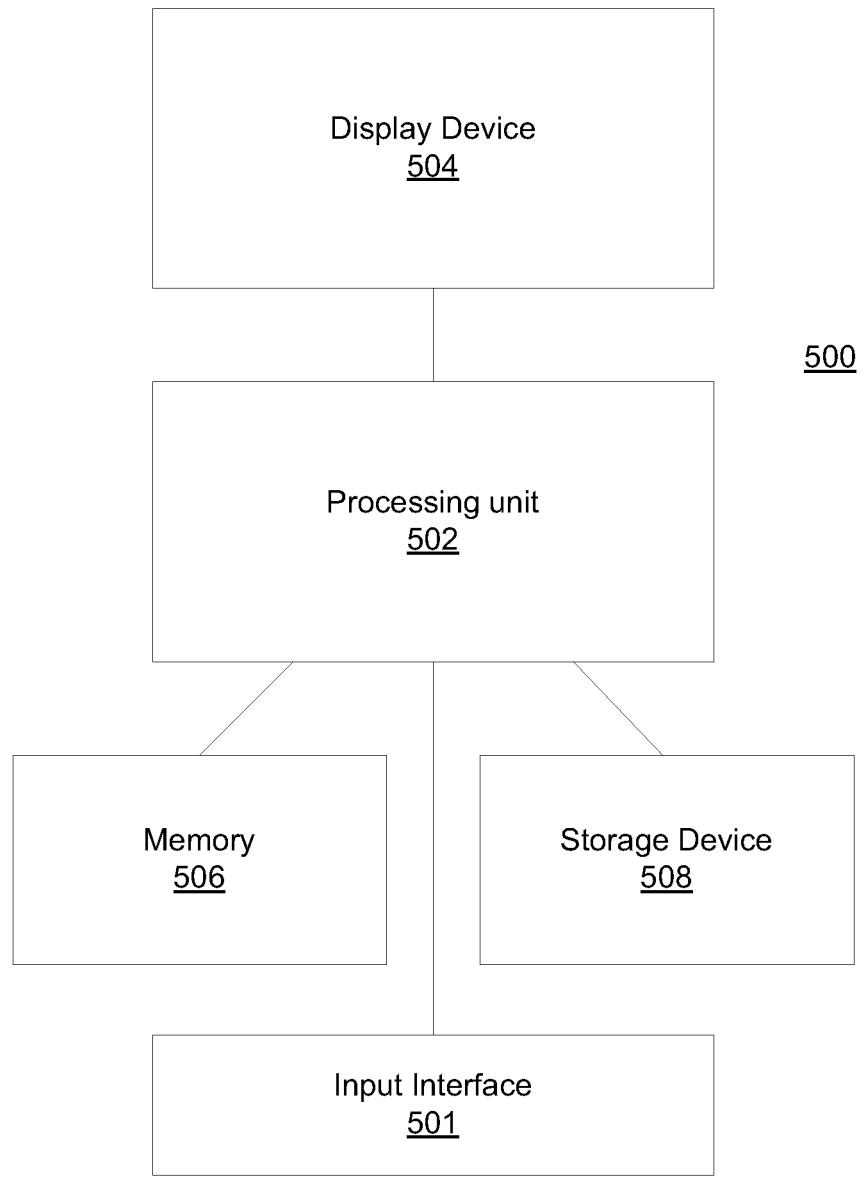
FIG. 5 illustrates a system for configuring a predictive model and deploying it on a target platform, according to some embodiments of the present invention.

FIG. 5 illustrates a system 500 for generating a model and deploying it on a target platform, according to some embodiments of the present invention.

System 500 may include a processing unit 502 (e.g. one or a plurality of computer processors, controllers, etc., on a single machine or distributed on a plurality of machines) for executing a method according to some embodiments of the present invention. Processing unit 502 may be linked with memory 506 on which a program implementing a method according to some embodiments and corresponding data may be loaded and run from, and storage device 508, which includes a non-transitory computer readable medium (or mediums) such as, for example, one or a plurality of hard disks, flash memory devices, etc. on which data (e.g. dynamic object information, values of fields, etc.) and a program implementing a method according to embodiments and corresponding data may be stored. System 40 may further include display device 504 (e.g. CRT, LCD, LED etc.) on which one or a plurality user interfaces associated with a program implementing a method according to some embodiments and corresponding data may be presented. System 500 may also include input device 501, such as, for example, one or a plurality of keyboards, pointing devices, touch sensitive surfaces (e.g. touch sensitive screens), etc. for allowing a user to input commands and data.

Figure 6:
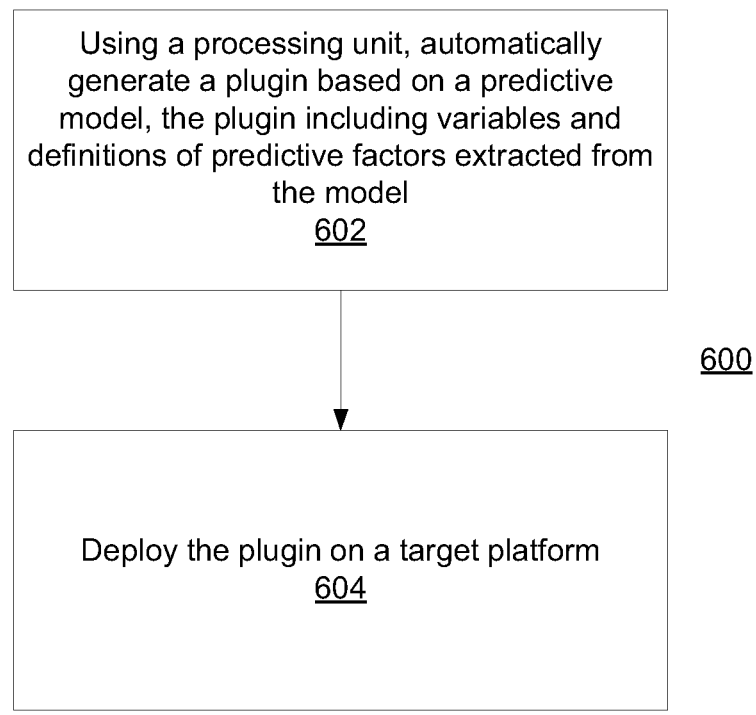
FIG. 6 illustrates a method for configuring a predictive model and deploying it on a target platform, according to some embodiments of the present invention.

FIG. 6 illustrates a method for generating a model and deploying it on a target platform, according to some embodiments of the present invention.

According to some embodiments, method 600 may include using a processing unit, automatically generating 602 a plugin based on a statistical model, the plugin including variables and definitions of predictive factors extracted from the model. The method may also include deploying 604 the plugin on a target platform.

Figure 7:
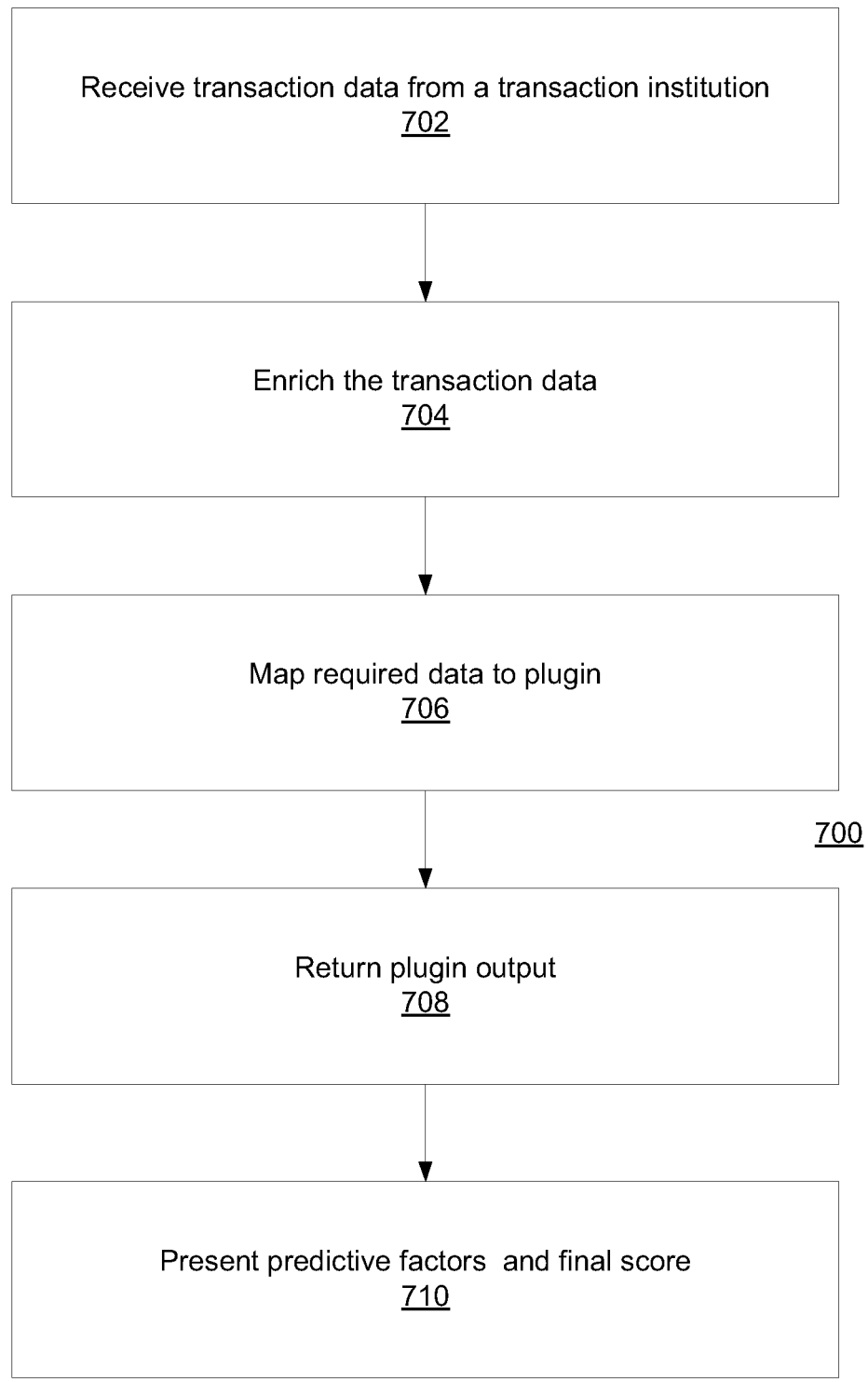
FIG. 7 illustrates a method of predictive management, based on a configured predictive model that was deployed on a target platform, according to some embodiments of the present invention.

FIG. 7 illustrates a method of risk management, based on a generated model that was deployed on a target platform, according to some embodiments of the present invention.

Method 700 may include receiving 702 transaction data from a financial institution (e.g., a bank, a credit card company, a clearing house, etc.). The transaction data may include many (typically, tens or hundreds of) fields depending on the institution or the type of prediction to be calculated or risk being detected (e.g debit card, remote banking). Some basic fields may be mandatory, such as, for example, customer ID, transaction amount, transaction date and time.

Method 700 may also include enriching 704 the received transaction data. For example, the received transaction data may be enriched by a basic predictive or risk detection solution. This may include obtaining third party information, for example metadata linked to the internet address of the customer, or device information from other providers. Other types of enrichment data that can be included in the plugin model may include: key indicator values, information based on historical profiles for different entities involved in the transaction (for example card, account, payee, device), aggregated historical data (for example number of transactions over a recent time period) and a score calculated by the fraud solution or any predictive or risk solution, based on the key indicator values. In some embodiments of the invention, if no transaction key was provided at this stage, then one may be generated.

By "solution" is meant any software application for fraud detection, risk detection, prediction, etc. that is executed on the target platform, Next data required by the model may be mapped 706 to the plugin. The fields required for input may be mapped to the plugin using, for example, a function call containing the relevant fields. A Transaction key may be provided. In some embodiments, fields in the current implementation of the plugin may be input as strings, with non-string fields converted to string equivalents during mapping.

Next, plugin output may be returned 708 to the solution running on the target platform. Variables calculated by the plugin may be returned as fields of a Java Bean. The fields included may differ depending on the model. However, a transaction key field may preferably be included for quality assurance. Fields may include variables defined in the model CSV including data transformations, and model scores.

Finally, predictive factors and final score may be presented 710. A final score and a set of one or a plurality of predictive factors may be mapped to the data structures of the fraud (or any predictive or risk) solution and depending on policy and workflow may be forwarded to an operator. In some embodiments this may be forwarded together with all the transaction data.

Figure 8:
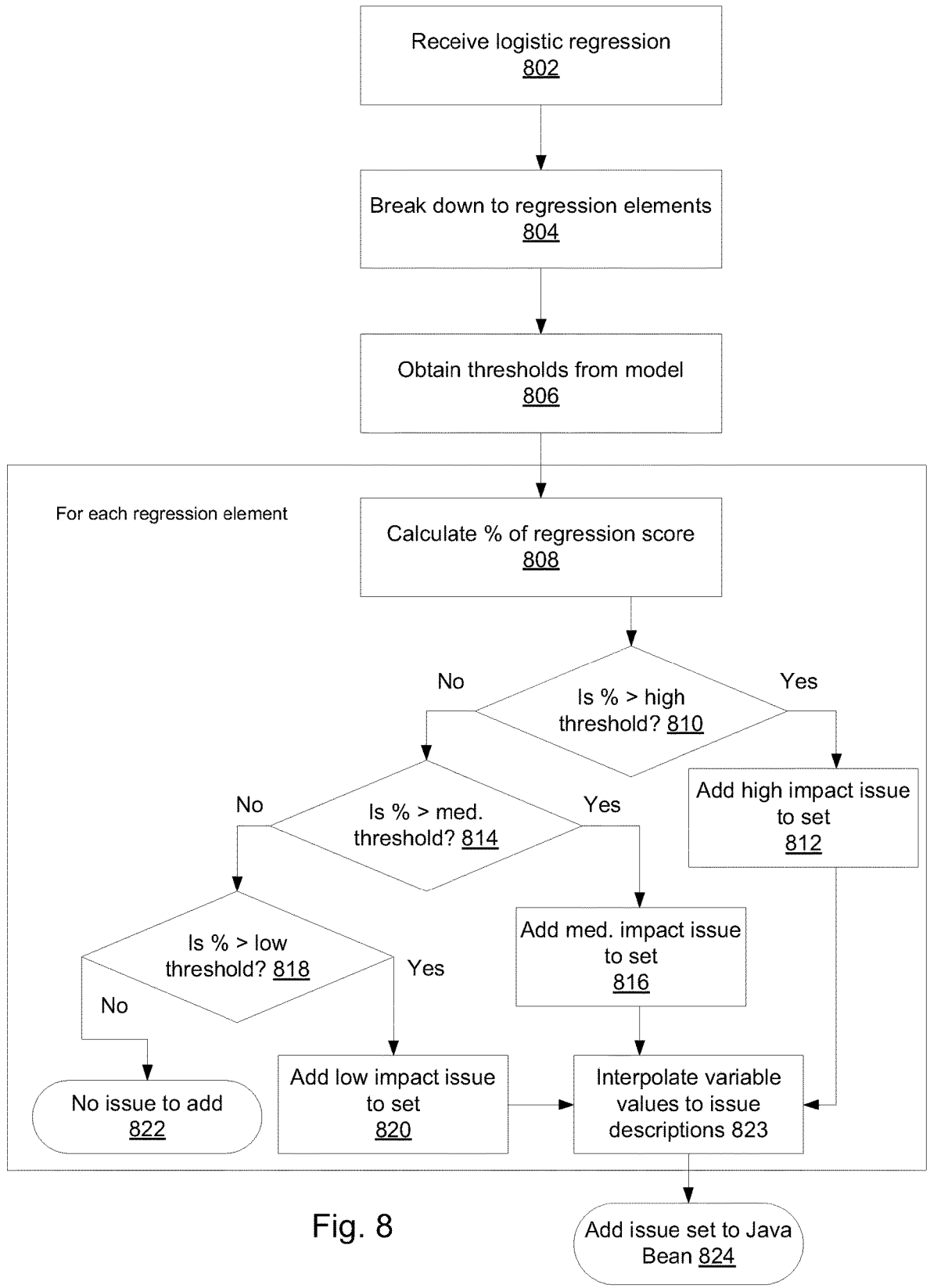
FIG. 8 illustrates an example of issue gravity calculation, according to some embodiments of the present invention.

FIG. 8 illustrates an example of issue gravity calculation, according to some embodiments of the present invention.

An equation for calculating a prediction score may be received 802, for example a multiple logistic regression calculation. Such equation may include, for example, a plurality of regression elements, and presented in the form of: constant+coefficient1*variable1+ coefficient2*variable2+ . . . +coefficientN*variableN (for N elements). The coefficient typically represents the weight assigned to its corresponding variable in the final calculated score. Each variable typically represents an issue.

Each element of this equation is a product variable of a variable and its corresponding coefficient. Next, the logistic regression equation is broken down 804 to its elements. Thresholds may be obtained 806 from the model (e.g., the CSV model). For example, there can be various threshold levels defined, e.g., high, medium and low thresholds, for each variable. More or less threshold levels may be applied, as desired.

The next steps are carried out for each element of the logistic regression.

A regression score is calculated 808 for each element. It may be represented in the form of percentage. It is then determined 810 whether the regression score is greater than a high threshold. If it is greater than the high threshold, than the issue represented by that regression element is added 812 to an issue list, indicated as an issue of high impact.

If the regression score is not greater than the high threshold than it is further determined 814 whether it is greater than a medium threshold. If it is greater than the medium threshold than the issue represented by that regression element is added 816 to the issue list, indicated as an issue of low impact.

If the regression score is not greater than the medium threshold than it is further determined 818 whether it is greater than a low threshold. If it is greater than the low threshold than the issue represented by that regression element is added 820 to the issue list, indicated as an issue of medium impact.

If the regression score is not greater than the low threshold than it is not added to the issue list.

Variable values are then interpolated 823 to issue descriptions associated with the corresponding variables.

All elements of the multiple logistic regression undergo the above steps until the issue list is completed. When all elements have been processed, the issue list may be added 824 to a Java bean for export.

Figure 9:
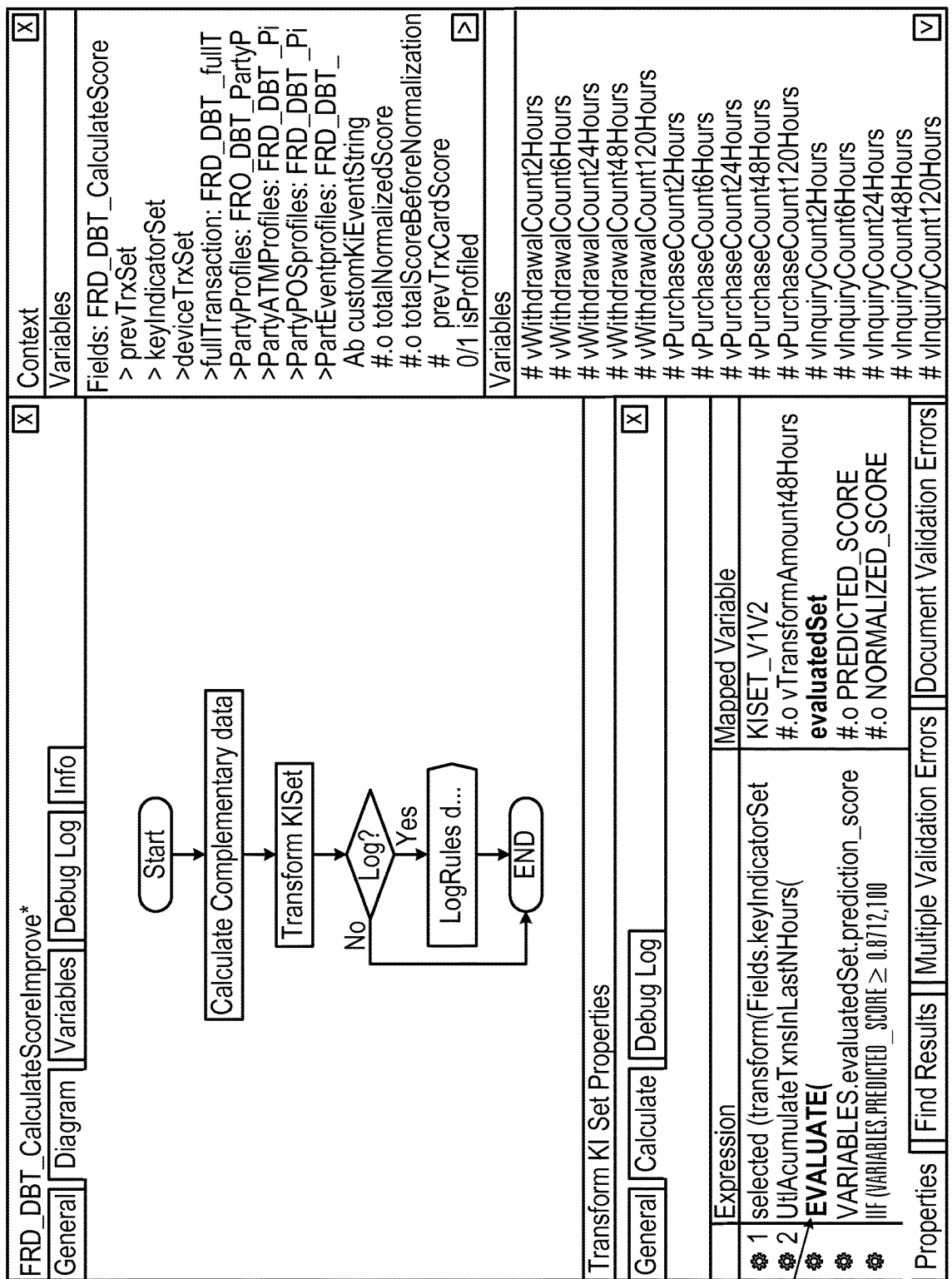
FIG. 9 shows an example of a screen shot of a Graphical User Interface (GUI) screen of a predictive application running on a target platform, according to some embodiments of the present invention.

FIG. 9 is an example for a screen shot of a Graphical User Interface (GUI) screen 900 of a risk detection application running on the target platform (see FIG. 1), according to some embodiments of the present invention. The screen 900 shows SMO exit point as viewed on the analytics modelling platform. The plugin is called by the EVALUATE function 902. The transaction context available to the plugin in the risk detection application is visible on the right hand side 904.

FIG. 10 shows an example of a screen shot of a screen 1000 showing an expanded EVALUATE function, according to some embodiments of the present invention. The operator may an expression builder of the application running on the target platform in order to build a function call, allowing mapping of the necessary data to the plugin.

FIG. 11 shows an example of a screen shot of a screen 1100 showing an alert displaying a list of predictive factors and their level of impact, as determined according to some embodiments of the present invention. In the present example the displayed alert includes three predictive factors: unusual high dollar transaction amount, suspicious similar amount sequence activity, and suspicious total amount, all indicated as having medium impact.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the disclosure.

The invention claimed is:

1. A method for fraud detection on a target platform, the method comprising:

producing, by a modelling platform, a fraud detection predictive model comprising a plurality of issue indicators, the model defining issue indicator calculations and impact if an issue indicator is true, wherein each issue indicator is associated with an issue definition comprising text describing the associated issue indicator in a natural language, wherein the natural language is an ordinary language of a human:

using a processing unit on a first platform, automatically generating an executable fraud detection plugin based on the fraud detection predictive model and based on platform specific characteristics of the target platform, the target platform being different than the first platform the issue indicators and issue definitions being mapped to a plugin code template for the plugin the plugin to calculate a prediction score for each of the plurality of issue indicators, based on the issue indicator calculations of the model, and to determine for each of the plurality of issue indicators if the issue indicators have a prediction score higher than a threshold;

the plugin to return a set of issue definitions wherein each issue definition in the set of Issue definitions is associated with an issue indicator having a prediction score higher than the threshold;

deploying the plugin on the target platform; and wherein the fraud detection predictive model is a logistic regression model comprising a pluarlity of regression elements, wherein each element of the plurality of regression elements is a product of an issue indicator of the plurality of issue indicators and a corresponding coefficient, and wherein the prediction score is a regression score.

2. The method of claim 1, comprising compiling the plugin code template.

3. The method of claim 1, further comprising generating an example plugin function call.

4. The method of claim 1, wherein the plugin is configured to cause the target platform to present the set of issue definitions relating to a transaction based on a transaction data that was received by the target platform.

5. The method of claim 1, further comprising building the model.

6. The method of claim 5, further comprising building the model on an analytics modelling platform.

7. The method of claim 1, wherein the plugin is configured to cause the target platform to present the set of issue definitions in a format that is readable by a human.

8. A non-transitory computer readable storage medium having stored thereon instructions that when executed by a processor cause the processor to perform the method of:

producing a fraud detection predictive model comprising a plurality of issue indicators, the model defining issue indicator calculations and impact if an issue indicator is true, wherein each issue indicator is associated with an issue definition comprising text describing the associated issue indicator in a natural language, wherein the natural language is an ordinary language of a human:

automatically configuring an executable fraud detection plugin based on the fraud detection predictive model and based on platform specific characteristics of a target platform, the issue indicators and issue definitions being mapped to a plugin code template for the plugin;

the plugin to calculate a prediction score for each of the plurality of issue indicators, based on the issue indicator calculations of the model, and to determine for each of the plurality of issue indicators if the issue indicators have a prediction score higher than a threshold;

the plugin to return a set of issue definitions, wherein each issue definition in the set of issue definitions is associated with an issue indicator having a prediction score higher than the threshold;

deploying the plugin on the target platform; and wherein the fraud detection predictive model is a logistic regression model comprising a plurality of regression elements, wherein each element of the plurality of regression elements is a product of an issue indicator of the plurality of issue indicators and a corresponding coefficient, and wherein the prediction score is a regression score.

9. The non-transitory computer readable storage medium of claim 8, having stored thereon instructions that when executed by a processor cause the processor to compile the plugin code template.

10. The non-transitory computer readable storage medium of claim 8, having stored thereon instructions that when executed by a processor cause the processor to generate an example plugin function call.

11. The non-transitory computer readable storage medium of claim 8, wherein the plugin is configured to cause the target platform to present the set of issue definitions relating to a transaction based on transaction data that was received by the target platform.

12. The non-transitory computer readable storage medium of claim 8, having stored thereon instructions that when executed by a processor cause the processor to build the model.

13. The non-transitory computer readable storage medium of claim 12, having stored thereon instructions that when executed by a processor cause the processor to build the model on an analytics modelling platform.

14. A system comprising: a memory; and a processing unit on a first platform, the processing unit configured to:

produce a fraud detection predictive model comprising a plurality of issue indicators, the model defining issue indicator calculations and impact if an issue indicator is true, wherein each issue indicator is associated with an issue definition comprising text describing the associated issue indicator in a natural language, wherein the natural language is an ordinary language of a human;

automatically configure an executable fraud detection plugin based on the fraud detection predictive model and based on platform specific characteristics of the target platform the issue indicators and issue definitions being mapped to a plugin code template for the plugin;

the plugin to calculate a prediction score for each of the plurality of issue indicators, based on the issue indicator calculations of the model and to determine for each of the plurality of issue indicators if the issue indicators have a prediction score higher than a threshold;

the plugin to return a set of issue definitions, wherein each issue definition in the set of issue definitions is associated with an issue indicator having a prediction score higher than the threshold;

deploy the plugin on the target platform; and wherein the fraud detection predictive model is a logistic regression model comprising a plurality of regression elements, wherein each element of the plurality of regression elements is a product of an issue indicator of the plurality of issue indicators and a corresponding coefficient, and wherein the prediction score is a regression score.

15. The system of claim 14, wherein the processing unit is further configured to compile the plugin code template.

16. The system of claim 14, wherein the processing unit is further configured to generate an example plugin function call.

17. The system of claim 14, wherein the plugin is configured to cause the target platform to present the set of issue definitions relating to a transaction based on a transaction data that was received by the target platform.

18. The system of claim 14, wherein the processing unit is further configured to facilitate building the model.

* * * * *